(12) United States Patent
Nentwig

(10) Patent No.: US 9,287,904 B2
(45) Date of Patent: Mar. 15, 2016

(54) INTERFERENCE REDUCTION

(71) Applicant: BROADCOM CORPORATION, Irvine, CA (US)

(72) Inventor: Markus Nentwig, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 57 days.

(21) Appl. No.: 14/048,545

(22) Filed: Oct. 8, 2013

(65) Prior Publication Data

US 2014/0106690 A1 Apr. 17, 2014

(30) Foreign Application Priority Data

Oct. 16, 2012 (GB) ................... 1218574.0

(51) Int. Cl.
*H04B 1/04* (2006.01)
*H04B 1/034* (2006.01)

(52) U.S. Cl.
CPC ............ *H04B 1/0475* (2013.01); *H04B 1/0483* (2013.01)

(58) Field of Classification Search
CPC ............................ H04B 1/0475; H04B 1/0438
USPC .................... 455/114.2, 114.3, 126
See application file for complete search history.

(56) References Cited

U.S. PATENT DOCUMENTS

| | | |
|---|---|---|
| 2004/0219891 A1 | 11/2004 | Hadjichristos |
| 2005/0069026 A1 | 3/2005 | Vepsalainen et al. |
| 2005/0079835 A1 | 4/2005 | Takabayashi et al. |
| 2006/0062325 A1 | 3/2006 | Jensen |
| 2006/0067427 A1 | 3/2006 | Zolfaghari et al. |

FOREIGN PATENT DOCUMENTS

GB 2489002 9/2012

*Primary Examiner* — Lee Nguyen
(74) *Attorney, Agent, or Firm* — Oblon, McClelland, Maier & Neustadt, L.L.P.

(57) ABSTRACT

Measures for interference reduction for an envelope branch type transmitter. Such measures may include determination of a target frequency span for reducing interference caused by an envelope branch type transmitter, and configuration of a differential delay between a signal branch and an envelope branch of the envelope branch type transmitter on the basis of the determined target frequency span.

17 Claims, 5 Drawing Sheets

INTERFERENCE REDUCTION

CROSS REFERENCE TO RELATED APPLICATION

This application claims benefit under 35 U.S.C. §119(a) and 37 CFR 1.55 to UK patent application no. GB 1218574.0, filed on 16 Oct. 2012, the entire content of which is hereby incorporated by reference.

TECHNICAL FIELD

The present disclosure relates to interference reduction. In particular, but not exclusively, the present disclosure relates to measures (including methods, apparatuses, computer programs and computer program products) for realising interference reduction for an envelope branch type transmitter.

BACKGROUND

In the development of transmitters for wireless devices, envelope branch type transmitters are considered as an architectural concept for improving transmitter efficiency. In such envelope branch type transmitters, a signal portion (hereinafter referred to as signal) and an envelope portion (hereinafter referred to as envelope) are derived from an input signal, and the signal and the envelope are separately supplied to a power amplifier via different branches. The power amplifier generates a transmit signal on the basis of the signal supplied on a signal branch and the envelope supplied on an envelope branch, wherein a supply voltage of the power amplifier is modulated in accordance with the envelope. Thereby, an increased supply voltage to the power amplifier during signal peaks of the input signal is enabled, which improves signal quality and output power with the same or even lower power consumption as compared with a conventional transmitter architecture with constant power amplifier supply voltage.

In such envelope branch type transmitters, a delay mismatch between the signal branch and the envelope branch causes distortion. Such distortion basically results from (interaction of the delay mismatch with) various nonlinear effects of the power amplifier, including one or more weak nonlinear effects such as nonlinear transconductance in transistors, strong nonlinear effects, such as saturation in transistors and clipping, and frequency-dependent nonlinear effects such as the reactance of a bias line interacting with one of the above weak or strong nonlinear effects. For example, a large delay mismatch may cause insufficient supply voltage at the power amplifier during input signal peaks, causing the peaks to be cut off.

Such nonlinear effects in the power amplifier thus cause unwanted spectral components at the output of the power amplifier, i.e. in the transmit signal, that may interfere with radio transmissions in the transmit and/or receive directions of a wireless device. Accordingly, the caused unwanted spectral components result in interference which may occur in the transmit band of the transmitter, either as adjacent channel or in-channel interference, or in the receive band of a receiver within the same transceiver as the transmitter.

Accordingly, the delay mismatch between the signal branch and the envelope branch of an envelope branch type transmitter needs to be balanced or compensated with high accuracy (for example in the order of nanoseconds) so as to reduce interference. However, a single delay balance (or compensation) value typically cannot be found which is capable of sufficiently reducing interference both in the transmit band of the transmitter, i.e. adjacent channel and in-channel interference, and in the receive band of a receiver within the same transceiver as the transmitter. That is to say, when applying a single fixed delay balance (or compensation) value, potentially significant interference remains in at least some frequency ranges, which could, in certain cases, only be suppressed by using more expensive (duplex) filters.

Thus, there is a need to improve interference reduction for an envelope branch type transmitter.

SUMMARY

According to first embodiments, there is a method for use in interference reduction for an envelope branch type transmitter, the method comprising:

determining a target frequency span for reducing interference caused by the envelope branch type transmitter; and configuring a differential delay between a signal branch and an envelope branch of the envelope branch type transmitter on the basis of the determined target frequency span.

According to second embodiments, there is apparatus for use in interference reduction for an envelope branch type transmitter in a wireless device, the apparatus comprising at least one processor, and at least one memory including computer program code, the at least one memory and the computer program code being configured to, with the at least one processor, cause the apparatus at least to:

determine a target frequency span for reducing interference caused by the envelope branch type transmitter; and configure a differential delay between a signal branch and an envelope branch of the envelope branch type transmitter on the basis of the determined target frequency span According to embodiments, there is apparatus comprising means for determining a target frequency span for reducing interference caused by an envelope branch type transmitter, and means for configuring a differential delay between a signal branch and an envelope branch of the envelope branch type transmitter on the basis of the determined target frequency span.

According to third embodiments, there is a computer program product comprising a (non-transitory) computer-readable storage medium having computer readable instructions stored thereon, the computer readable instructions being executable by a computerised device to cause the computerised device to perform the method of the first embodiments.

Such computer program product may for example comprise or be embodied as a (tangible) computer-readable (storage) medium or the like on which the computer-executable computer program code is stored, and/or the program may be directly loadable into an internal memory of the computer or a processor thereof.

According to embodiments, there is apparatus for use in interference reduction for an envelope branch type transmitter, substantially in accordance with any of the examples as described herein with reference to and illustrated by the accompanying drawings.

Further developments or modifications of the aforementioned example embodiments are set out in the following.

By virtue of the aforementioned example embodiments of the present disclosure, there are improved techniques for interference reduction for an envelope branch type transmitter.

Thus, enhancements are achieved by methods, apparatus, computer programs and/or computer program products enabling/realizing improved interference reduction for an envelope branch type transmitter.

Further features of embodiments will become apparent from the following description of preferred embodiments, given by way of example only, which is made with reference to the accompanying drawings.

BRIEF DESCRIPTION OF THE DRAWINGS

For a more complete understanding of example embodiments of the present disclosure, reference is now made to the following description taken in connection with the accompanying drawings in which.

DETAILED DESCRIPTION

Example aspects of the present disclosure will be described herein below. More specifically, aspects of the present are described hereinafter with reference to particular non-limiting examples of the present disclosure. A person skilled in the art will appreciate that the embodiments are by no means limited to these examples, and may be more broadly applied.

It is to be noted that the following description of the present disclosure and its embodiments mainly refers to specifications being used as non-limiting examples. Such specifications are only used in the context of the presented non-limiting examples, and do naturally not limit embodiments in any way.

Hereinafter, various embodiments and implementations of the present disclosure and its aspects or embodiments are described using several alternatives. It is generally noted that, according to certain needs and constraints, all of the described alternatives may be provided alone or in any conceivable combination (also including combinations of individual features of the various alternatives).

According to embodiments of the present disclosure, in general terms, there are provided mechanisms, measures and means for enabling realizing interference reduction for an envelope branch type transmitter.

In the following, embodiments of the present disclosure are described with reference to methods, procedures and functions, as well as with reference to structural arrangements and configurations.

Figure 1:
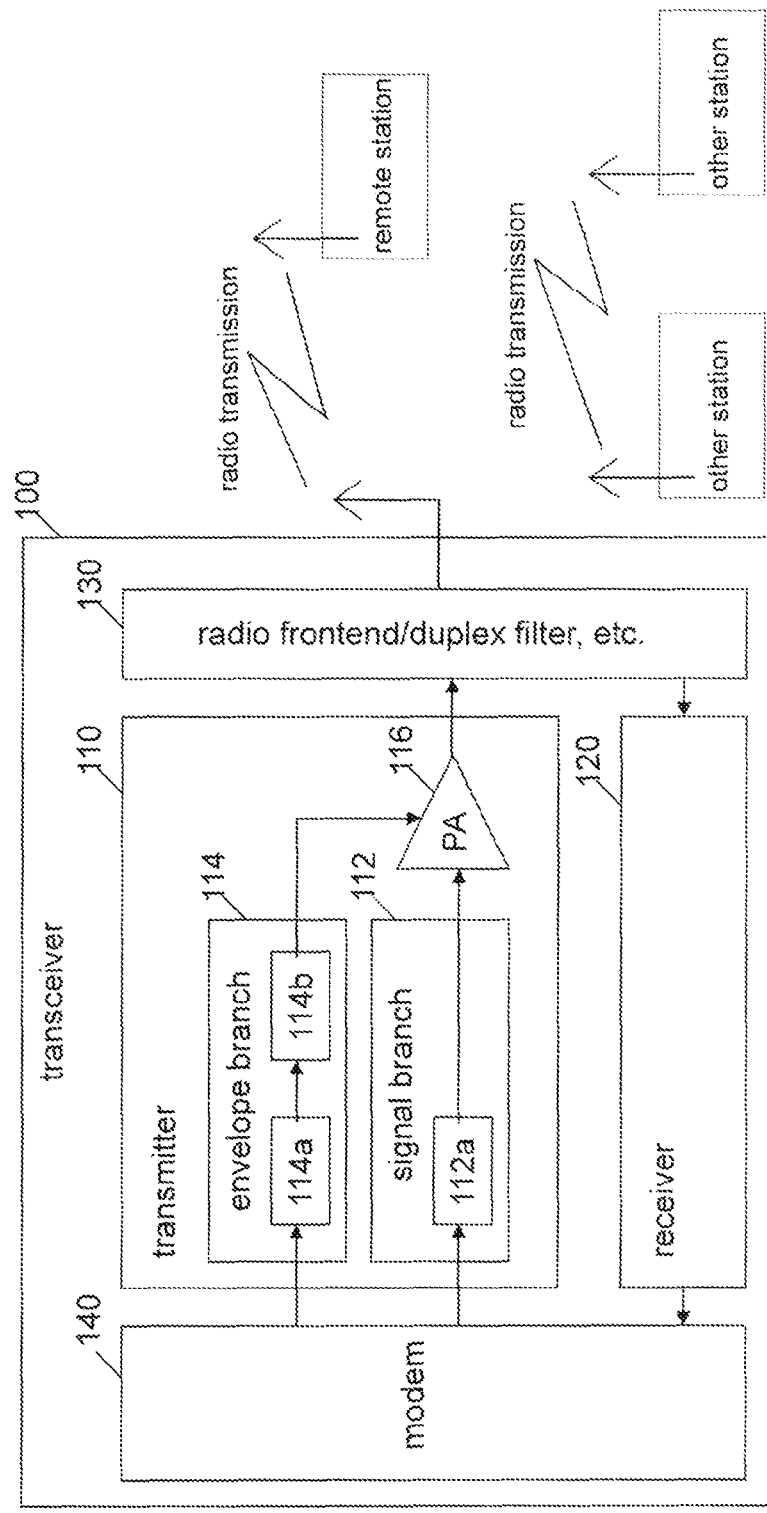
FIG. 1 shows a schematic block illustrating a transceiver and its surrounding operating environment, to which embodiments of the present disclosure are applicable.

FIG. 1 shows a schematic block illustrating a transceiver and its surrounding operating environment, to which embodiments of the present disclosure are applicable.

It is to be noted that FIG. 1 is to represent a simplified block diagram only, for which similar explanations as those made below for the simplified block diagram of FIG. 5 apply accordingly.

As shown in FIG. 1, a transceiver 100 (which may be implemented in a chipset, a module, a device, a station, or the like) could initiate a radio transmission to a remote station via an antenna. In the vicinity of the transceiver 100, other radio transmissions between other stations could also occur.

As shown in FIG. 1, the transceiver 100 comprises a transmitter 110, a receiver 120, a radio frontend/duplex filter part 130 and a modem 140. The transmitter 110 is of envelope branch type, and comprises a signal branch 112 for supplying a signal portion of an input signal (hereinafter referred to as signal), wherein the signal could comprise a modulation signal of a radio frequency, a high frequency, an intermediate frequency, or the like, and an envelope branch 114 for supplying an envelope portion of the input signal (hereinafter referred to as envelope) to a power amplifier 116. The signal branch 112 and/or the envelope branch 114 comprise at least one delay element 112a and/or 114a, respectively. By virtue of such delay element(s) 112a and/or 114a, a differential delay between the signal branch 112 and the envelope branch 114 is configurable, as detailed below. Further, the envelope branch 114 comprises an envelope modulator 114b for modulating the supply voltage of the power amplifier 116 in accordance with the envelope, which may be realized by means of a switched mode power supply (not shown) in the envelope modulator.

The envelope branch type transmitter 110, for which embodiments of the present disclosure are applicable, may be any transmitter having an envelope branch for modulating the supply voltage of a power amplifier in accordance with an envelope of an input signal. Such envelope branch type transmitter may involve any one of an envelope-tracking transmitter, a polar transmitter, an envelope-elimination-and-restoration transmitter, a Kahn-technique transmitter, and the like.

Whilst the envelope branch type transmitter 110 and the receiver 120 are for example operative in a radio frequency range, they could additionally or alternatively be operative in any other frequency range as well, such as high frequency, intermediate frequency, or the like. Further, the envelope branch type transmitter 110 and the receiver 120 may be operative for the same or different systems, applications, or the like (at any time). For example, the envelope branch type transmitter 110 may be operable for a mobile communication system such as e.g. GSM, GPRS, UMTS. WCDMA, 3G, LTE/LTE-A, WLAN, or the like, whilst the receiver 120 may be operable for the same communication system or for a positioning system such as e.g. GPS. An arrangement with an LTE transmitter and a GPS receiver could be subject to interference-related problems, when a target frequency span for interference reduction (see below) is determined as 1565.5 . . . 1585.5 MHz, if the transmitter operates in LTE band 24 with a transmit frequency between 1626.5 and 1660.5 MHz, and a GPS receiver in the same transceiver is a GPS receiver operating at a fixed frequency of 1575.5 MHz.

As described above, a delay mismatch between the signal branch 112 and the envelope branch 114 in the envelope branch type transmitter 110 causes distortion and thus interference in the form of unwanted spectral components at the output of the power amplifier 116, i.e. in or by a transmit signal of the transmitter 110. Such interference could be caused externally or on a radio path, i.e. on a radio transmission of the transceiver 100 or by the radio transmission of the transceiver 100 to another radio transmission in the vicinity of the transceiver 100 or by the radio transmission of the transceiver 100 to a radio reception of the receiver 120 of the transceiver 100. Also, such interference could be caused internally or on a coupling path between the transmitter 110 and the receiver 120 and/or a radio part (such as a radio frontend, duplex filters, or the like) within the transceiver 100 (for example, when the transmitter 110 and the receiver 120 and/or the radio frontend/duplex filter part 130 are implemented on a common printed wiring board). Such coupling may for example be of current/voltage flow, magnetic, inductive, capacitive nature, or the like.

Figure 2:
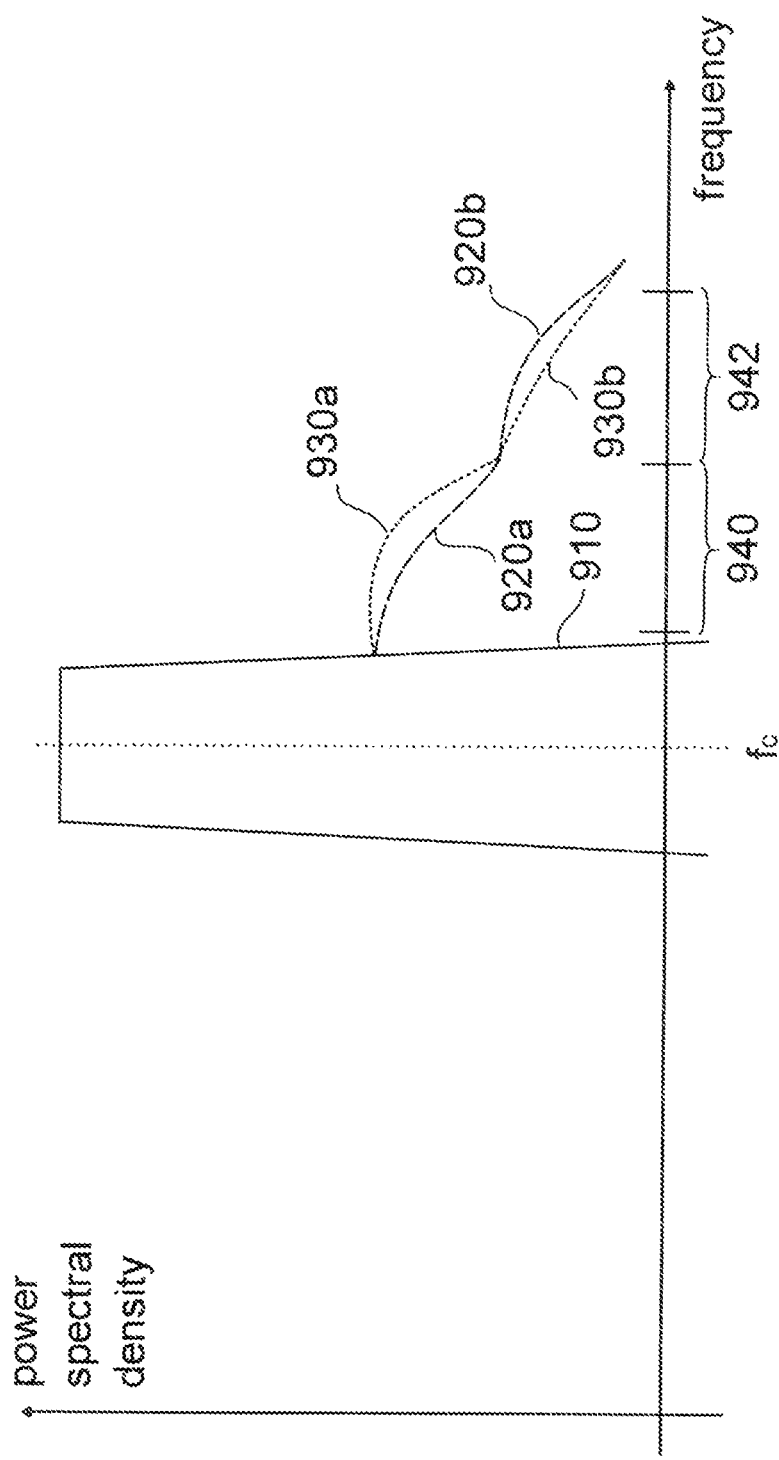
FIG. 2 shows a graph illustrating wanted and unwanted spectral components by frequency for different delay mismatches in an envelope branch type transmitter in the transceiver of FIG. 1.

FIG. 2 shows a graph illustrating wanted and unwanted spectral components by frequency for different delay mismatches in an envelope branch type transmitter in the transceiver of FIG. 1. More specifically, FIG. 2 illustrates wanted and unwanted spectral components by frequency for different delay mismatches at the output of the power amplifier 116 in the envelope branch type transmitter 110.

As shown in FIG. 2, a transmit signal at carrier frequency $f_C$ results in wanted spectral components 910 in a frequency span around carrier frequency $f_C$. Further, due to a delay mismatch and nonlinear effects in the power amplifier, different unwanted spectral components could result in different frequency ranges. For example, a first set of unwanted spectral components 920a and 920b (illustrated by a dashed line) could result in the case of a first delay mismatch, i.e. a first differential delay between the signal branch and the envelope branch of the transmitter 110, and a second set of unwanted spectral components 930a and 930b (illustrated by a dotted line) could result in the case of a second delay mismatch, i.e. a second differential delay between the signal branch and the envelope branch of the transmitter 110. In this example, application of the first differential delay causes less unwanted power. i.e. less distortion or interference in frequency span 940, but more unwanted power, i.e. more distortion or interference in frequency span 942, respectively. To the contrary, application of the second differential delay causes more unwanted power, i.e. more distortion or interference in frequency span 940, but less unwanted power, i.e. less distortion or interference in frequency span 942, respectively.

The difference in the interference effects on different frequency spans with different differential delays could result from various physical effects, especially in/around the power amplifier. In this regard, memory effects in the power amplifier and/or a bias network could be mentioned in this regard. For example, in specific examples, it could be observed that various nonlinear effects add either constructively and destructively, and a (relatively small) change in the differential delay can be used to shift a zone of constructive interference out of a subject frequency span where it would be particularly damaging (e.g. for receiver sensitivity) to another frequency span.

It is noted that, while FIG. 2 exemplifies a one-sided power spectral density distribution with respect to the carrier frequency, the power spectral density distribution may also be symmetrical with respect to the carrier frequency. In case of such symmetrical power spectral density, additional unwanted spectral components in corresponding frequency spans occur to the left of the carrier frequency in FIG. 2, respectively.

For the purpose of the following description, it is assumed that the center frequency span around carrier frequency corresponds to (a part of) a channel or in-channel frequency range or a transmit band of transceiver 100 or transmitter 110, frequency span 940 corresponds to (a part of) an adjacent channel frequency range of transceiver 100 or transmitter 110, and frequency span 942 corresponds to (a part of) a receive band of transceiver 100 or receiver 120. Any one of the center frequency span, the frequency span 940 and the frequency span 942 could additionally or alternatively correspond to (a part of) a radio transmission band between external devices such as the other stations of FIG. 1.

In view of the graph of FIG. 2, the present inventor has found that different delay mismatches, i.e. different differential delays, result in different interference power in different frequency spans. Stated in other words, the present inventor has found that a delay mismatch, i.e. a differential delay, for reducing interference in different frequency spans is not the same in an envelope branch type transmitter. Specifically, whilst the first delay mismatch or differential delay result leads to lower interference power in near frequencies such as an adjacent channel frequency range of a transceiver, the second delay mismatch or differential delay result leads to lower interference power in far frequencies such as a receive band of a transceiver.

In measurements of the power density spectrum at the output of a power amplifier in an envelope branch type transmitter operating in the 3GPP-specified band 17 (with the center frequency of 710 MHz and a duplex spacing (TX-RX separation) of only 30 MHz), the following is observed as an example of the above-outlined relations under specified measurement conditions.

Adjacent channel performance is optimal at a differential delay of 0 ns, in which case the integrated interference in the RX band is −29.24 dBm (−55.2 dBc). Receive hand performance is optimal at a differential delay of 8.0 ns, in which case the integrated interference in the RX band is −31.75 dBm (−57.7 dBc). Accordingly, a difference of 2.5 dB is observed for the RX band interference between the cases of differential delays of 0 ns and 8.0 ns.

According to further measurements, similar improvements apply at TX-RX separations near or below 50 MHz, which are used e.g. in 3GPP-specified bands 5, 6, 8, 11, 12, 13, 14, 18, 19, 20, 21.

As a result of the above-outlined relations and this measurement result, embodiments of the present disclosure teach configuration of the differential delay on the basis of a target frequency span for reducing interference caused by an envelope branch type transmitter. Stated in other words, embodiments of the present disclosure teach an adaptive differential delay configuration depending on the frequency or frequency span for interference reduction.

In the above measurement example, when the RX band is the target frequency span for reducing interference, as interference in the RX band noise will dominate and thus degrade receiver sensitivity, a substantial improvement (of 2.5 dB) can be achieved when configuring the differential delay to 8.0 ns instead of 0 ns. Otherwise, when the adjacent channel is the target frequency span for reducing interference, a substantial improvement (approximately 6 dB) can be achieved when configuring the differential delay to 0 ns instead of 8.0 ns.

Figure 3:
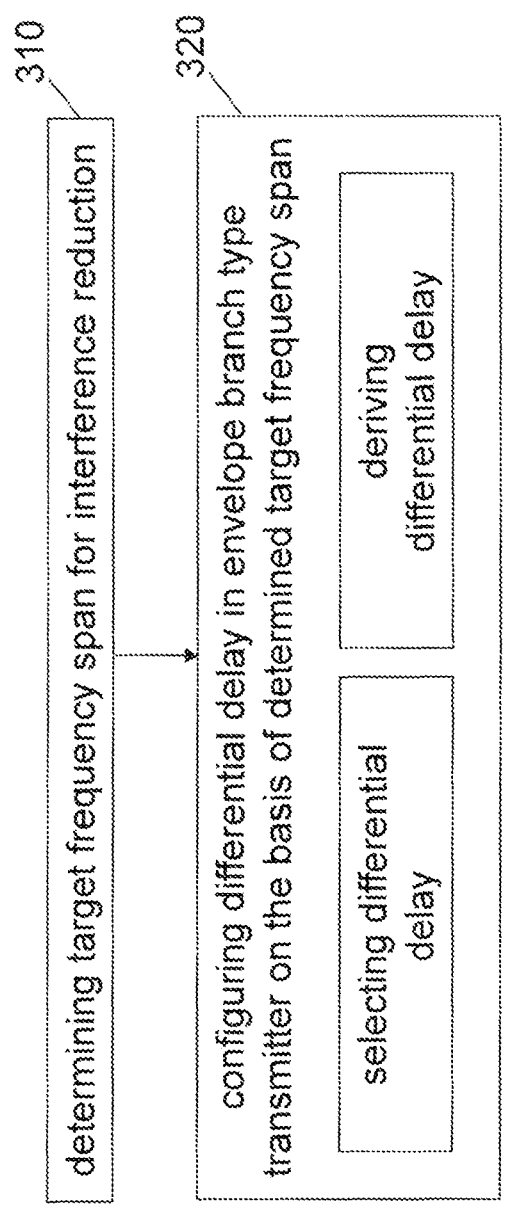
FIG. 3 shows a flowchart illustrating an example of a procedure according to embodiments of the present disclosure.
Figure 4:
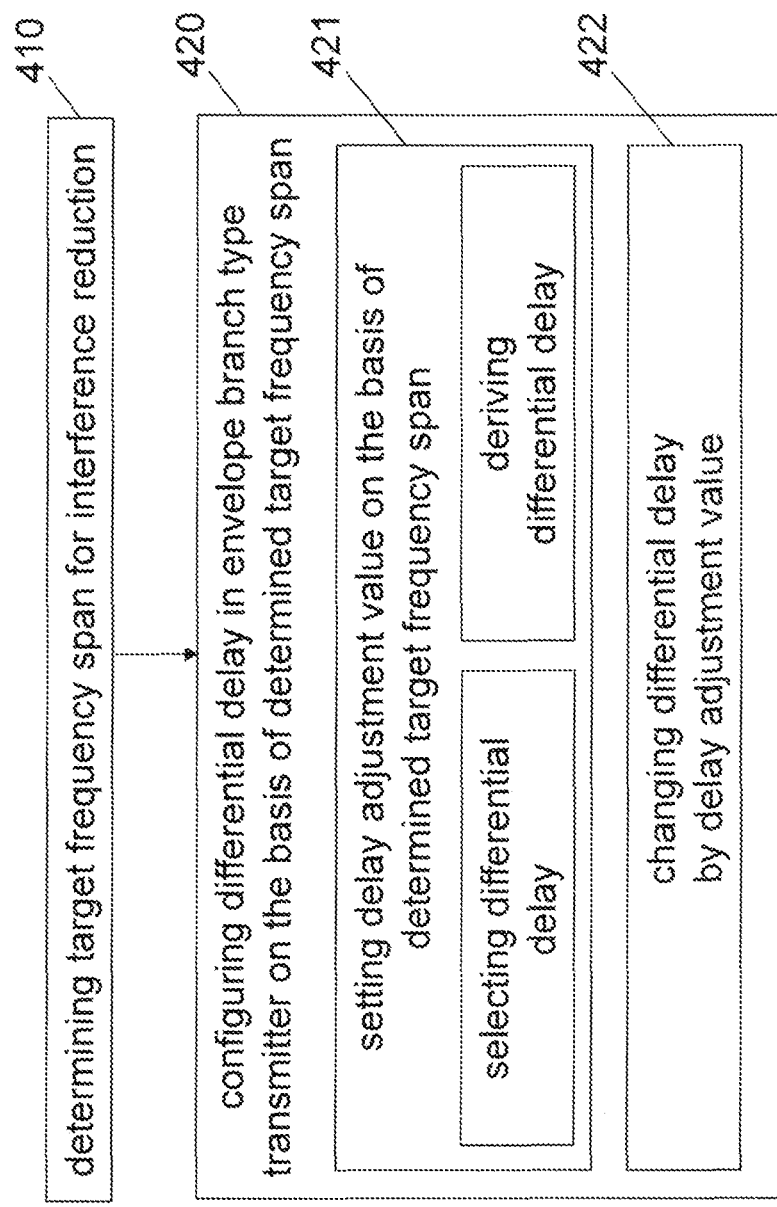
FIG. 4 shows a flowchart illustrating another example of a procedure according to embodiments of the present disclosure.

In the following, procedures according to embodiments of the present disclosure are exemplified with reference to the flowcharts of FIGS. 3 and 4. It is to be noted that the flowcharts of FIGS. 3 and 4 are simplified in the sense that only operations/functionalities relating to embodiments of the present disclosure are illustrated and described. That is to say, any other operations/functionalities occurring at a respective entity are omitted for the sake of clarity, whilst such other operations/functionalities could in fact occur e.g. between two illustrated operations/functionalities, simultaneously with any one of the illustrated operations/functionalities, or the like.

FIG. 3 shows a flowchart illustrating an example of a procedure according to embodiments of the present disclosure.

As shown in FIG. 3, a procedure according to embodiments of the present disclosure comprises an operation (310) of determining a target frequency span for reducing interference caused by an envelope branch type transmitter, and an operation (320) of configuring a differential delay between a signal branch and an envelope branch of the envelope branch type transmitter on the basis of the determined target frequency span.

It is noted that the determination operation 310 may correspond to predefined settings and/or conditions or the like. That is to say, such operation does not necessarily have to be actively executed, but could be accomplished implicitly in that the executing entity (such as a chipset, module or device) knows in advance which frequency span is to be addressed for interference reduction on the basis of predefined settings and/or conditions.

The configuration operation 320 could be realized by a corresponding configuration of a delay structure in the transmitter. Such delay structure could comprise the delay element 112a in the signal branch and/or the delay element 114a in the envelope branch of the transmitter 110 of FIG. 1, which is/are configurable such that a delay difference between said branches corresponds to the differential delay to be configured.

According to embodiments of the present disclosure, such procedure is applicable for a use case in which the transmitter has a predetermined set of differential delays, i.e. differential delay values, which are known/defined to be optimal or at least useful for specific frequency spans, respectively. In such a use case, the transmitter could configure the differential delay with a predefined value to reduce interference in the form of unwanted emissions at a corner of a spectral emission mask (which is specified by a radio standard and could be provided by means of a network signaled value e.g. from a base station to a terminal or user equipment). Also, the transmitter could configure the differential delay with a predefined value to reduce interference in the form of unwanted emissions at the corner of the spectral emission mask, if a transmitted signal strength or transmit power is above a predetermined threshold (e.g. 22 dBm), and otherwise the transmitter could configure the differential delay with a predefined value to reduce in-channel distortion and/or error vector magnitude, thus improving throughput.

Accordingly, the target frequency span could be determined as at least part of a transmit band of the transmitter, in which no radio transmission is desired, such as an adjacent channel (i.e. the corner of the spectral emission mask) or a receive band, or at least part of a transmit band of the transmitter, in which radio transmission is desired, such as a (in-) channel (i.e. the channel frequency). Such determination could be based on a spectrum emission mask for a radio transmission of the envelope branch type transmitter, potentially in connection with a transmitted signal strength or transmit power level of a radio transmission of the transmitter. In an embodiment of the present disclosure, the determination could be based on a spectrum emission mask that is dynamically changed by a base station via a "network signalled value" as defined e.g. in 3GPP specification 3GPP TS 36.101.

Similarly, the target frequency span could be determined as at least part of a receive band of the receiver of the transceiver or at least part of a radio transmission band between external devices, as described above in connection with FIG. 1. Similarly, the determination could additionally or alternatively be based on a transmit band for a radio transmission of the transmitter and/or a subcarrier allocation for a radio transmission of the transmitter and/or a received signal strength or receive power level of a radio reception on a receive band of the receiver of the transceiver.

FIG. 4 shows a flowchart illustrating another example of a procedure according to embodiments of the present disclosure.

As shown in FIG. 4, a procedure according to embodiments of the present disclosure comprises a determination operation 410 and a configuration operation 420, which may correspond to the determination operation 310 and the configuration operation 320 of FIG. 3, respectively. In this procedure, the configuration operation 420 comprises an operation (421) of setting a delay adjustment value on the basis of the determined target frequency span, and an operation (422) of changing the differential delay in accordance with the set delay adjustment value. The differential delay may be overwritten or updated with the set delay adjustment value, or incremented or decremented by the set delay adjustment value, for example.

According to embodiments of the present disclosure, such procedure is applicable for a use case in which the transmitter does not know or have a definition of differential delays, i.e. differential delay values, which are optimal or at least useful for a specific frequency span. Thus, the transmitter could carry out a delay calibration. In such use case, the transmitter, for example in a wireless-enabled consumer electronics device, could calibrate the differential delay during operation of the device, including but not limited to a calibration phase during power-up of the device. This may ensure regular delay calibration to compensate for ageing effects or the like. A delay calibration could be performed by an iterative configuration of the differential delay. In such iterative configuration, the transmitter could iteratively set a delay adjustment value (i.e. make small changes to a delay adjustment value), change the differential delay by the delay adjustment value, and observe an effect thereof as a basis for a next iteration of delay configuration/calibration. The effect may for example be observed by a change in measured power in a subject frequency span (which could be measured with a measurement receiver, for example). The transmitter could comprise a set of delay adjustment values for operation in different frequency bands and measure power in a frequency span that is associated with the subject frequency hand.

As described above in connection with any of FIGS. 3 and 4 and as indicated therein, the configuration operation may comprise selecting the differential delay or the delay adjustment value from a predetermined set of differential delays or delay adjustment values depending on the target frequency span. Such selecting may for example be realized using a look-up table, a register, or the like.

Additionally or alternatively, as indicated in any of FIGS. 3 and 4, the configuration operation may comprise deriving the differential delay or the delay adjustment value based upon a result of an interference measurement on the target frequency span and/or a signal strength or power measurement on the target frequency span and/or feedback and/or control information from an external device. Example details in this regard are outlined below.

In one use case of embodiments of the present disclosure, the transceiver may utilize a measurement receiver for sensing the transmitted signal (in terms of at least one of transmitted signal strength or transmit power and a level of distortion or interference) and looping it back to the antenna. The looped-back signal could then be filtered with a band-pass filter that passes through a frequency span of an adjacent channel, a receive band, or the like. In view of current 3GPP specifications, such band-pass filter could be centered at 5 MHz offset, filtered with a root-raised cosine filter of 3.84 MHz bandwidth and roll-off of 1.22.

In one use case of embodiments of the present disclosure, a measurement receiver at the transceiver or a remote station (such as e.g. a base station) could estimate a level of unwanted emissions or interference in a subject frequency span and provide feedback and % or control information to the transceiver, in particular the transmitter. The level of unwanted emissions or interference may be estimated by band-pass power measurement, for example.

According to embodiments of the present disclosure, feedback and/or control information could comprise an estimated level of distortion or interference (e.g. in units of dBc) relative to a received signal strength or receive power level, and/or an instruction to reduce distortion/interference products in a specific frequency span or channel, such as a lower or higher adjacent channel or an alternate channel.

By virtue of embodiments of the present disclosure, the present inventor's finding that different delay mismatches. i.e. different differential delays, result in different interference power in different frequency spans, is addressed in that a differential delay is configured depending on the frequency or frequency span for interference reduction. Thereby, distortion or interference (including unwanted emissions or interference in/by a transmission from the transmitter and self-interference from the transmitter to the receiver) could be handled in an appropriate or even optimal way on the basis of a target frequency or frequency span for interference reduction.

Accordingly, various beneficial technical effects could be achieved by a frequency-dependent differential delay configuration according to embodiments of the present disclosure. A reduction of interference in a subject frequency span could be achieved. Further, for example, one or more of an improvement of (transmitter, receiver or overall) performance, a reduction in power consumption (e.g. of maximum power), a reduction in calibration efforts (including factory calibration and/or device-internal calibration), a reduction of failure or performance degradation risk (due to additional margins), etc. could be achieved. In the above measurement example, where the RX band is the target frequency span for reducing interference, noise in a RX band could be reduced and, thus, the receiver sensitivity and thus the overall transceiver performance could be enhanced. A reduction in interference may also enable higher transmit power levels and/or more complex signals within emission limits of a radio standard (for example, 64-QAM SC-FDMA instead of 16QAM SC-FDMA, or OFDM instead of SC-FDMA), resulting in improved throughput over longer distances (cell radius), for example.

Generally, the above-described procedures and functions may be implemented by respective functional elements, processing systems, processors, or the like, as described below.

While in the foregoing embodiments of the present disclosure are described primarily with reference to methods, procedures and functions, corresponding embodiments of the present disclosure also cover respective apparatuses, network nodes and systems, including both software and/or hardware thereof.

Respective embodiments of the present disclosure are described below referring to FIG. 5, whilst for the sake of brevity, reference is made to the detailed description with regard to FIGS. 1 to 4.

Figure 5:
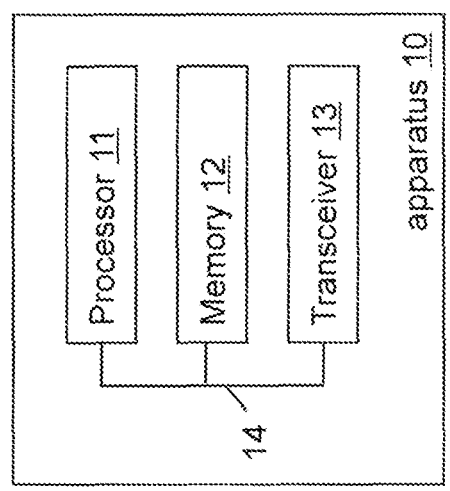
FIG. 5 shows a schematic block diagram illustrating an example apparatus according to embodiments of the present disclosure.

In FIG. 5 below, which is noted to represent a simplified block diagram, the solid line blocks are configured to perform respective operations as described above. The entirety of solid line blocks are configured to perform the methods and operations as described above, respectively. With respect to FIG. 5, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling therebetween, which may be a physical and/or logical coupling, which on the one hand is implementation-independent (e.g. wired or wireless) and on the other hand may also comprise an arbitrary number of intermediary functional entities not shown. The direction of an arrow is meant to illustrate the direction in which certain operations are performed and/or the direction in which certain data is transferred.

Further, in FIG. 5, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Amongst others, memories are provided for storing programs or program instructions for controlling the individual functional entities to operate as described herein.

FIG. 5 shows a schematic block diagram illustrating an example apparatus according to embodiments of the present disclosure.

In view of the above, the thus described apparatus 10 is suitable for use in practicing embodiments of the present disclosure, as described herein.

The thus described apparatus 10 corresponds to an entity which may represent a (part of a) device such as a (wireless) communication or terminal device for example a user equipment or the like. Such entity may correspond to a chipset or a module of/for a corresponding device (which may be installed as part thereof, but may be also a separate part which can be installed in or attached to various devices). The apparatus 10 is configured to perform a procedure and/or functionality as described in conjunction with any one of FIGS. 1, 3 and 4.

Generally, an apparatus 10 according to embodiments of the present disclosure may comprise at least one processor 11, at least one memory 12 including computer program code, and at least one transceiver or interface 13 configured for communication with at least another apparatus, which may be connected by a bus 14. Further, in an apparatus 10 according to embodiments of the present disclosure, at least one processor 11 and at least one memory 12 including computer program code (and at least one transceiver or interface 13 configured for communication with at least another apparatus), wherein the at least one processor, with the at least one memory and the computer program code, is configured to cause the apparatus to perform as described herein, may be considered as a processing system.

The memory 12 may store respective programs assumed to include program instructions or computer program code that, when executed by the respective processor, enables the respective electronic device or apparatus to operate in accordance with embodiments of the present disclosure. For example, the memory 12 may store corresponding settings or predefined values/sets of differential delays and/or delay adjustment values for respective frequency spans, as described above.

The transceiver or interface 13 may correspond to the transceiver 100 of FIG. 1. That is to say, the transceiver or interface 13 may comprise an envelope branch type transmitter, i.e. a transmitter having an envelope branch for modulating the supply voltage of a power amplifier in accordance with an envelope of an input signal, such as an envelope-tracking transmitter, a polar transmitter, an envelope-elimination-and-restoration transmitter, a Kahn-technique transmitter, or the like.

In general terms, the device/apparatus (and/or parts thereof) may represent means for performing respective operations and/or exhibiting respective functionalities, and/or the device/apparatus (and/or parts thereof) may have functions for performing respective operations and/or exhibiting respective functionalities.

When in the subsequent description it is stated that a processor or processing system is configured to perform some function, this is to be construed to the equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

In its most basic form, according to embodiments of the present disclosure, the apparatus 10 or its processor 11 (i.e. a processing system thereof) is configured to determine a target frequency span for reducing interference caused by an envelope branch type transmitter, and configure a differential delay between a signal branch and an envelope branch of the envelope branch type transmitter on the basis of the determined target frequency span.

In modifications or developments thereof, the apparatus 10 or its processor 11 (i.e. a processing system thereof) may be configured to:

set a delay adjustment value on the basis of the determined target frequency span, and change the differential delay by the set delay adjustment value, and/or perform the configuring by at least one of selecting the differential delay or the delay adjustment value from a predetermined set of differential delays or delay adjustment values depending on the determined target frequency span, and deriving the differential delay or the delay adjustment value based on at least one of a result of an interference measurement on the determined target frequency span, a signal strength or power measurement on the determined target frequency span, and feedback and/or control information from an external device.

For further details of specifics regarding functionalities according to embodiments of the present disclosure, reference is made to the foregoing description in conjunction with FIGS. 1 to 4.

According to embodiments of the present disclosure, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the ideas of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic). TTL (Transistor-Transistor Logic), etc. using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, the present disclosure and, or embodiments thereof provide measures for interference reduction for an envelope branch type transmitter. Such measures may comprise determination of a target frequency span for reducing interference caused by an envelope branch type transmitter, and configuration of a differential delay between a signal branch and an envelope branch of the envelope branch type transmitter on the basis of the determined target frequency span.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

LIST OF ACRONYMS AND ABBREVIATIONS

3GPP Third Generation Partnership Project
GPRS General Packet Radio System
GPS Global Positioning System
GSM Global System for Mobile Communication
LTE Long Term Evolution
LTE-A Long Term Evolution Advanced
OFDM Orthogonal Frequency Division Multiple Access
PA Power Amplifier
QAM Quadrature Amplitude Modulation
RX Receive/Receiver
SC-FDMA Single Carrier Frequency Division Multiple Access
TX Transmit/Transmitter
WCDMA Wideband Code Division Multiple Access
WLAN Wireless Local Area Network
UMTS Universal Mobile Telecommunications System

What is claimed is:

1. A method for use in interference reduction for an envelope branch type transmitter in a transceiver that further includes a receiver, the method comprising:
    determining a target frequency span for reducing interference caused by the envelope branch type transmitter, the determination of the target frequency span being made between at least (i) a first frequency band that corresponds to an adjacent channel to a transmit frequency band for a radio transmission of the envelope branch type transmitter and (ii) a second frequency band that corresponds to a receive band of the receiver, the determination of which of the first frequency band and the second frequency span is the target frequency band being based on at least one of a predetermined setting and a current interference condition; and
    configuring a differential delay between a signal branch and an envelope branch of the envelope branch type transmitter on the basis of the determined target frequency span,
    wherein the differential delay is determined based on at least one of selecting the differential delay or the delay adjustment value from a predetermined set of differential delays or delay adjustment values depending on the determined target frequency span and deriving the differential delay based on at least feedback and/or control information from an external device.

2. A method according to claim 1, wherein the determining is based on at least one of:
    the transmit frequency band for a radio transmission of the envelope branch type transmitter,
    a subcarrier allocation for a radio transmission of the envelope tracking branch transmitter,
    a spectrum emission mask for a radio transmission of the envelope branch type transmitter,
    a received signal strength or receive power level of a radio reception on the receive band of the receiver, and
    a transmitted signal strength or transmit power level of a radio transmission of the envelope branch type transmitter.

3. A method according to claim 1, wherein the determined target frequency span further includes one of:
    at least part of the transmit frequency band of the envelope branch type transmitter in which no radio transmission is desired,
    at least part of the transmit frequency band of the envelope branch type transmitter in which radio transmission is desired,
    at least part of the receive band of a receiver, and
    at least part of a radio transmission band between external devices.

4. A method according to claim 1, wherein the configuring comprises:
    setting a delay adjustment value on the basis of the determined target frequency span; and
    changing the differential delay in accordance with the set delay adjustment value.

5. A method according to claim 1, wherein the differential delay is derived based on at least one of a result of an interference measurement on the determined target frequency span, a signal strength or power measurement on the determined target frequency span.

6. A method according to claim 1, wherein:
    the method is operable in or by at least one of a chipset, a module, and a device, which relates to or includes the envelope branch type transmitter, and/or
    the envelope branch type transmitter comprises one of an envelope-tracking transmitter, a polar transmitter, an envelope-elimination-and-restoration transmitter, and a Kahn-technique transmitter.

7. A method according to claim 1, wherein the determining is based on
    a received signal strength or receive power level of a radio reception on the receive band of a receiver.

8. A method according to claim 1, wherein the determination of the target frequency span is made to reduce interference caused by at least one of an external radio transmission of a transmit signal of the envelope branch type transmitter and an internal coupling of a transmit signal of the envelope branch type transmitter to at least one of a receiver and a radio part of a transceiver in which the envelope branch type transmitter is included.

9. A method according to claim 1, wherein the a predetermined set of differential delays includes a value of 0 ns when the first frequency span is the determined target frequency band and 8 ns when the second frequency band is the determined target frequency span.

10. An apparatus for use in interference reduction for an envelope branch type transmitter in a transceiver of a wireless device that further includes a receiver, the apparatus comprising:
    circuitry configured to:
        determine a target frequency span for reducing interference caused by the envelope branch type transmitter, the determination of the target frequency span being made between at least (i) a first frequency band that corresponds to an adjacent channel to a transmit frequency band for a radio transmission of the envelope branch type transmitter and (ii) a second frequency band that corresponds to a receive band of the receiver, the determination of which of the first frequency band and the second frequency band is the target frequency span being based on at least one of a predetermined setting and a current interference condition; and configure a differential delay between a signal branch and an envelope branch of the envelope branch type transmitter on the basis of the determined target frequency span, wherein the differential delay is determined based on at least one of selecting the differential delay or the delay adjustment value from a predetermined set of differential delays or delay adjustment values depending on the determined target frequency span and deriving the differential delay based on at least feedback and/or control information from an external device.

11. The apparatus according to claim 10, wherein the circuitry is configured to cause the apparatus at least to perform the determining based on at least one of:

the transmit frequency band for a radio transmission of the envelope branch type transmitter, a subcarrier allocation for a radio transmission of the envelope tracking branch transmitter, a spectrum emission mask for a radio transmission of the envelope branch type transmitter, a received signal strength or receive power level of a radio reception on the receive band of the receiver, and a transmitted signal strength or transmit power level of a radio transmission of the envelope branch type transmitter.

12. The apparatus according to claim 10, wherein the determined target frequency span further includes one of:

at least part of the transmit frequency band of the envelope branch type transmitter in which no radio transmission is desired, at least part of the transmit frequency band of the envelope branch type transmitter in which radio transmission is desired, at least part of the receive band of a receiver, and at least part of a radio transmission band between external devices.

13. The apparatus according to claim 10, wherein the circuitry is configured to cause the apparatus at least to, for the configuring:

set a delay adjustment value on the basis of the determined target frequency span; and change the differential delay in accordance with the set delay adjustment value.

14. The apparatus according to claim 10, wherein the differential delay is derived based on at least one of a result of an interference measurement on the determined target frequency span, a signal strength or power measurement on the determined target frequency span.

15. The apparatus according to claim 10, wherein the envelope branch type transmitter comprises:

a power amplifier arranged to generate a transmit signal of the envelope branch type transmitter on the basis of a signal on the signal branch and an envelope on the envelope branch, and/or at least one delay element in at least one of the signal branch and the envelope branch, which is configurable in accordance with the differential delay.

16. The apparatus according to claim 10, wherein:

the apparatus is embodied as or in at least one of a chipset, a module, and a device, which relates to or includes the envelope tracking type transmitter, and/or the envelope branch type transmitter comprises one of an envelope-tracking transmitter, a polar transmitter, an envelope-elimination-and-restoration transmitter, and a Kahn-technique transmitter.

17. A non-transitory computer-readable storage medium having computer readable instructions stored thereon, the computer readable instructions being executable by an apparatus for use in interference reduction for an envelope branch type transmitter in a transceiver of a wireless device that further includes a receiver to cause the apparatus to perform a method comprising:

determining a target frequency span for reducing interference caused by the envelope branch type transmitter, the determination of the target frequency span being made between at least (i) a first frequency band that corresponds to an adjacent channel to a transmit frequency band for a radio transmission of the envelope branch type transmitter and (ii) a second frequency band that corresponds to a receive band of the receiver, the determination of which of the first frequency band and the second frequency band is the target frequency span being based on at least one of a predetermined setting and a current interference condition; and configuring a differential delay between a signal branch and an envelope branch of the envelope branch type transmitter on the basis of the determined target frequency span, wherein the differential delay is determined based on at least one of selecting the differential delay or the delay adjustment value from a predetermined set of differential delays or delay adjustment values depending on the determined target frequency span and deriving the differential delay based on at least feedback and/or control information from an external device.

* * * * *